United States Patent
Stambaugh

(10) Patent No.: US 9,951,717 B2
(45) Date of Patent: Apr. 24, 2018

(54) ASYMMETRIC LOAD COMPENSATION SYSTEM

(71) Applicant: Hamilton Sundstrand Corporation, Charlotte, NC (US)

(72) Inventor: Craig T. Stambaugh, Tolland, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 107 days.

(21) Appl. No.: 14/687,302

(22) Filed: Apr. 15, 2015

(65) Prior Publication Data

US 2016/0305272 A1  Oct. 20, 2016

(51) Int. Cl.
  *F02K 1/76* (2006.01)
  *F02K 1/12* (2006.01)
  *F02K 3/10* (2006.01)

(52) U.S. Cl.
  CPC .............. *F02K 1/1223* (2013.01); *F02K 1/76* (2013.01); *F02K 1/763* (2013.01); *F02K 3/10* (2013.01); *F05D 2220/323* (2013.01); *F05D 2270/64* (2013.01)

(58) Field of Classification Search
  CPC ........ F02K 1/763; F02K 1/76; F05D 2270/64; F05D 2270/65; F05D 2270/323; F01K 1/1223; F01K 1/15; F01K 3/10
  USPC ........................................ 239/265.11–265.43
  See application file for complete search history.

(56) References Cited

U.S. PATENT DOCUMENTS

| | | | |
|---|---|---|---|
| 5,584,655 A | 12/1996 | Deering | |
| 5,611,489 A * | 3/1997 | Berneuil | F02K 1/123 239/265.19 |
| 5,613,636 A | 3/1997 | Zubillaga | |
| 5,797,544 A | 8/1998 | Ward et al. | |
| 5,813,611 A | 9/1998 | Cires et al. | |
| 8,402,743 B2 * | 3/2013 | Nouhaud | F02C 7/22 239/265.25 |
| 8,402,765 B2 | 3/2013 | Amkraut et al. | |
| 2004/0068977 A1 * | 4/2004 | McKay | F02K 1/16 60/226.2 |
| 2009/0266912 A1 | 10/2009 | Gukeisen | |
| 2011/0022345 A1 * | 1/2011 | Maalioune | F02K 1/72 702/115 |
| 2012/0137654 A1 * | 6/2012 | Burgess | F02K 1/06 60/204 |
| 2013/0149113 A1 | 6/2013 | Kohlenberg et al. | |
| 2014/0196996 A1 * | 7/2014 | Ito | B05B 13/005 188/266.2 |

FOREIGN PATENT DOCUMENTS

| | | |
|---|---|---|
| EP | 0557229 A1 | 8/1993 |
| EP | 0851110 A2 | 7/1998 |
| EP | 2138696 B1 | 12/2013 |

* cited by examiner

*Primary Examiner* — Alexander Valvis
(74) *Attorney, Agent, or Firm* — Carlson, Gaskey & Olds, P.C.

(57) ABSTRACT

This disclosure relates to a variable area nozzle of a gas turbine engine. The variable area nozzle includes, among other things, a control unit, a translatable structure, and a plurality of actuators configured to adjust the position of the translatable structure. The plurality of actuators are fluidly coupled to a common fluid source. The control unit is configured to provide instructions to at least one of the actuators to compensate for an asymmetric load from the translatable structure.

1 Claim, 5 Drawing Sheets

ASYMMETRIC LOAD COMPENSATION SYSTEM

STATEMENT REGARDING GOVERNMENT SUPPORT

This invention was made with government support under Contract No. N00019-06-C-3003 awarded by the Joint Strike Fighter (JSF) Program Office. The government has certain rights in this invention.

BACKGROUND

Gas turbine engines, particularly those in military applications, are known to include exhaust modules having an augmentor (also commonly referred to as an "afterburner") and a variable area nozzle (VAN). During operation of such engines, gas passes downstream of the turbine, expands, and loses temperature. The augmentor injects fuel downstream of the turbine to reheat the gas. In conjunction with the added heat, the pressure rises in the augmentor and the gas is ejected through the variable area nozzle at a relatively high velocity.

One known type of variable area nozzle includes a translatable synchronization ring coupled to a plurality of moveable flaps via one or more linkages. The synchronization ring is moveable in response to a plurality of actuators. In the example, the actuators are connected a common motive fluid source. Fluid is provided to each of the actuators in parallel to bring about a desired movement of the translatable synchronization ring and, in turn, the flaps.

Another known type of variable area nozzle includes a plurality of linear actuators disposed circumferentially about a synchronization ring. Each of the linear actuators is in communication with a control unit, which is configured to provide instructions to the linear actuators to adjust the position of the synchronization ring.

SUMMARY

This disclosure relates to a variable area nozzle including, among other things, a control unit, a translatable structure, and a plurality of actuators configured to adjust the position of the translatable structure. The plurality of actuators are fluidly coupled to a common fluid source. The control unit is configured to provide instructions to at least one of the actuators to compensate for an asymmetric load from the translatable structure.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows.

DETAILED DESCRIPTION

Figure 1:
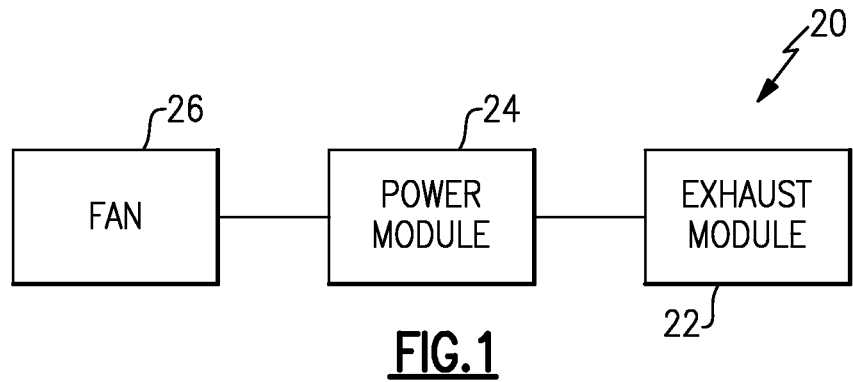
FIG. 1 is a highly schematic view of an example gas turbine engine.

FIG. 1 is a highly schematic view of an example gas turbine engine 20. In this example, the gas turbine engine includes an exhaust module 22 downstream of a power module 24 and a fan 26. Exhaust modules are typically included in military-type engines, and are known to include an augmentor (sometimes referred to as an "afterburner") and a variable area nozzle (sometimes abbreviated as "VAN").

The power module 24 includes a compressor section, a combustor section, and a turbine section. The products of the combustor expand in the turbine section and drive one or more shafts that, in turn, drive the compressor section and fan 26. Gas expelled by the fan 26 and the power module 24 is directed to the exhaust module 22. In the exhaust module, an augmentor injects fuel into the expelled gas to add heat and increase the pressure of the fluid. A variable area nozzle is adjusted to expel the gas from the engine 20 at a desired velocity.

Figure 2:
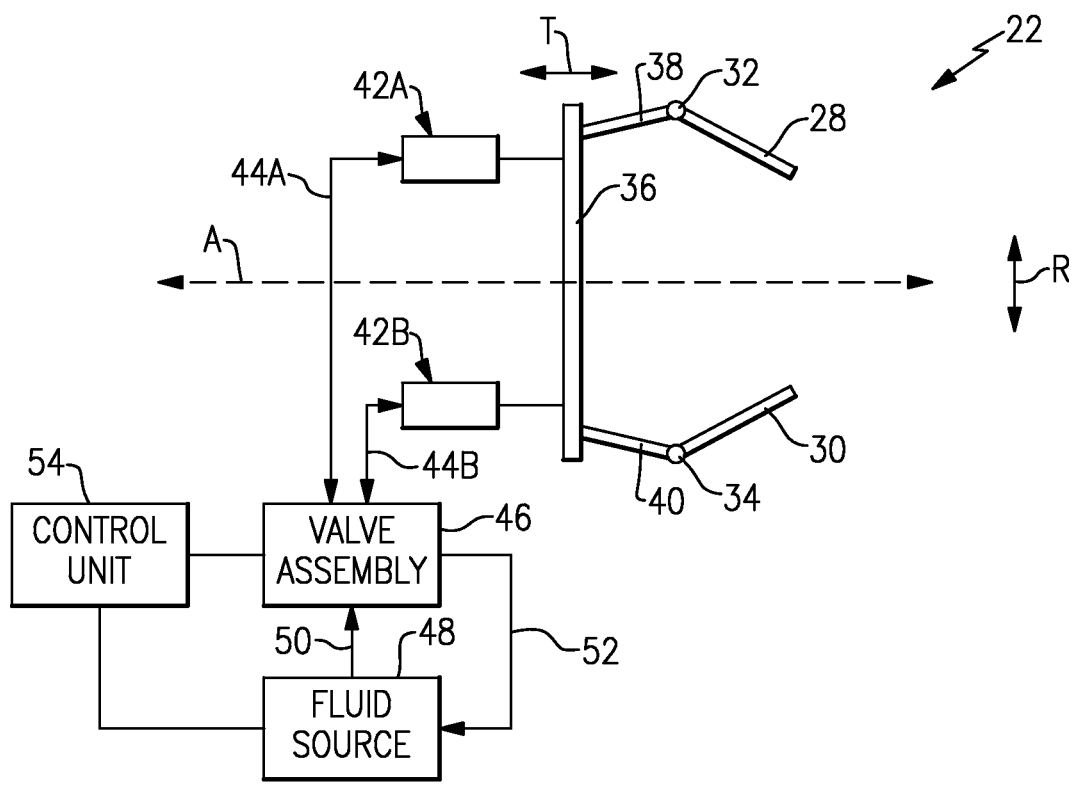
FIG. 2 schematically illustrates an example portion of an exhaust module.

FIG. 2 schematically illustrates an example portion of the exhaust module 22. As shown in FIG. 2, the exhaust module 22 includes a plurality of convergent flaps 28, 30 arranged about an engine central longitudinal axis A and configured to pivot radially inward and outward in the radial direction R (which is normal to the engine central longitudinal axis A) about respective pivot points 32, 34. Divergent flaps are also normally included in systems such as this, and are normally attached to the convergent flaps 28, 30 with a hinge similar to 32 and linkages similar to 38, 40, however the divergent flaps are not shown herein for simplicity.

The pivoting of the flaps 28, 30 is dictated by the translation of a translatable structure 36 in the direction T (which is parallel to the engine central longitudinal axis A). In this example, the translatable structure 36 is a synchronization ring. The translatable structure 36 is coupled to the flaps 28, 30 by one or more linkages 38, 40.

Figure 3:
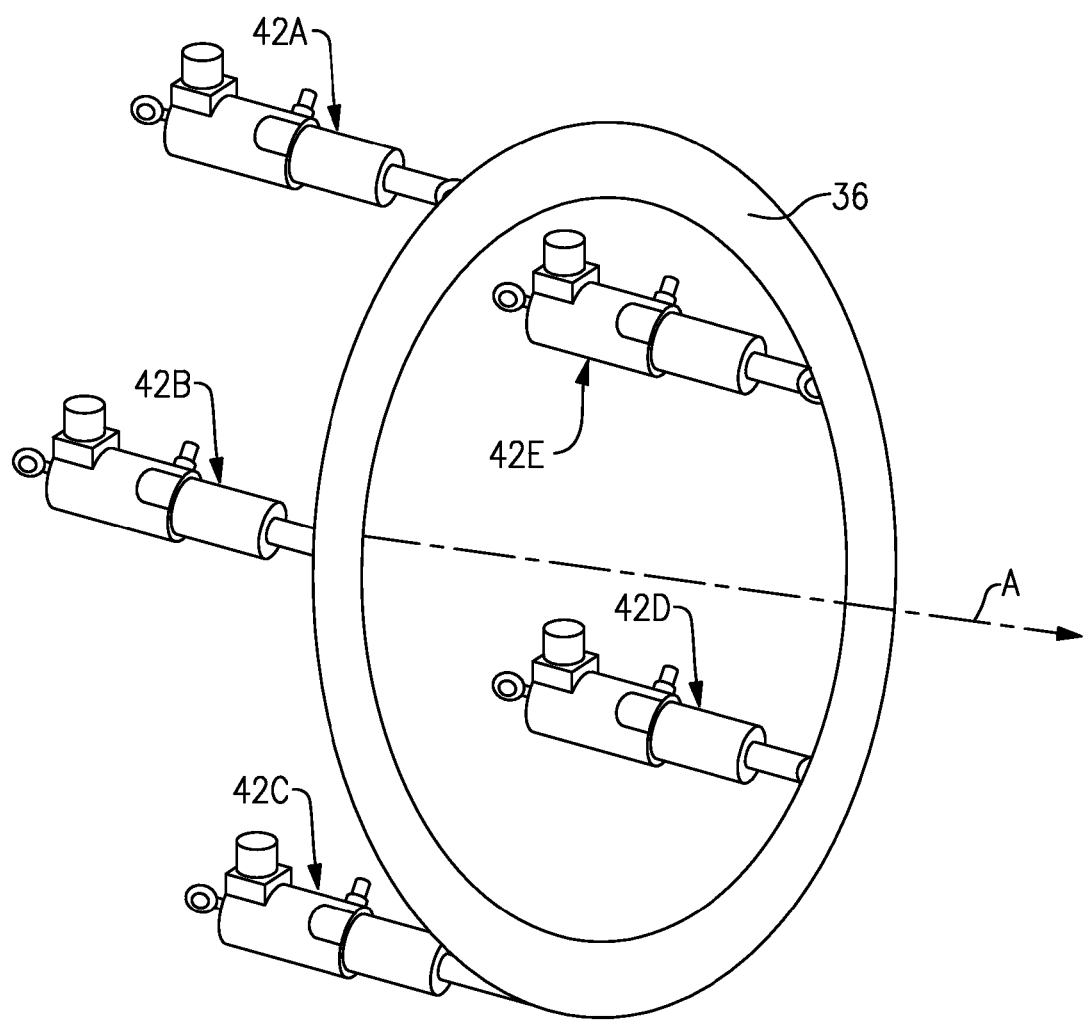
FIG. 3 schematically illustrates a plurality of actuators positioned relative to a synchronization ring.

In FIG. 2, only two actuators $42_A$, $42_B$ are illustrated. It should be understood, however, that this disclosure extends to any number of actuators. Further, the actuators may be arranged relative to the translatable structure 36 in any type of arrangement. In one example, which is illustrated in FIG. 3, there are five actuators $42_A$-$42_E$ coupled to the translatable structure 36. The actuators $42_A$-$42_E$ are equally spaced apart from one another in a circumferential direction about the engine central longitudinal axis A.

With reference back to FIG. 2, the actuators $42_A$-$42_B$ in one example are linear, cylinder actuators. The actuators $42_A$-$42_B$ are fluidly coupled via one or more fluid lines $44_A$, $44_B$ to a valve assembly 46, which, in one example, contains an electrohydraulic servo valve (EHSV) in communication with one or more lines, which may be arranged together in a desired manner and contain appropriately sized orifices. The valve assembly 46 is fluidly coupled to a high pressure fluid source 48, which may include one or more pumps, by at least one high pressure line 50 and at least one low pressure return 52. The actuators $42_A$-$42_B$ are fluidly coupled to the high pressure fluid source 48 and the valve assembly 46 in parallel. It should be understood that in examples with more than two actuators, that each actuator would be coupled to the valve assembly 46 by one or more (e.g., two) respective fluid lines.

In this example, the actuators $42_A$-$42_B$ are "slaves." That is, their relative position is dictated by the valve assembly 46 and fluid source 48, each of which receives instructions from a control unit 54.

The control unit 54 may be any known type of controller including memory, hardware, and software. The control unit 54 is configured to store instructions and to provide instructions in the form of control signals to the various components of the exhaust module 22, including the valve assembly 46 and the fluid source 48. The control unit 54 is also operable to receive signals from various sensors associated with the actuators $42_A$-$42_B$, and to provide instructions to an adjustable flow regulator, which is included in at least one of the actuators $42_A$-$42_B$. This will be discussed in detail below. The control unit 54 may be part of a main controller of an engine, or may receive instructions from such a controller.

Figure 4:
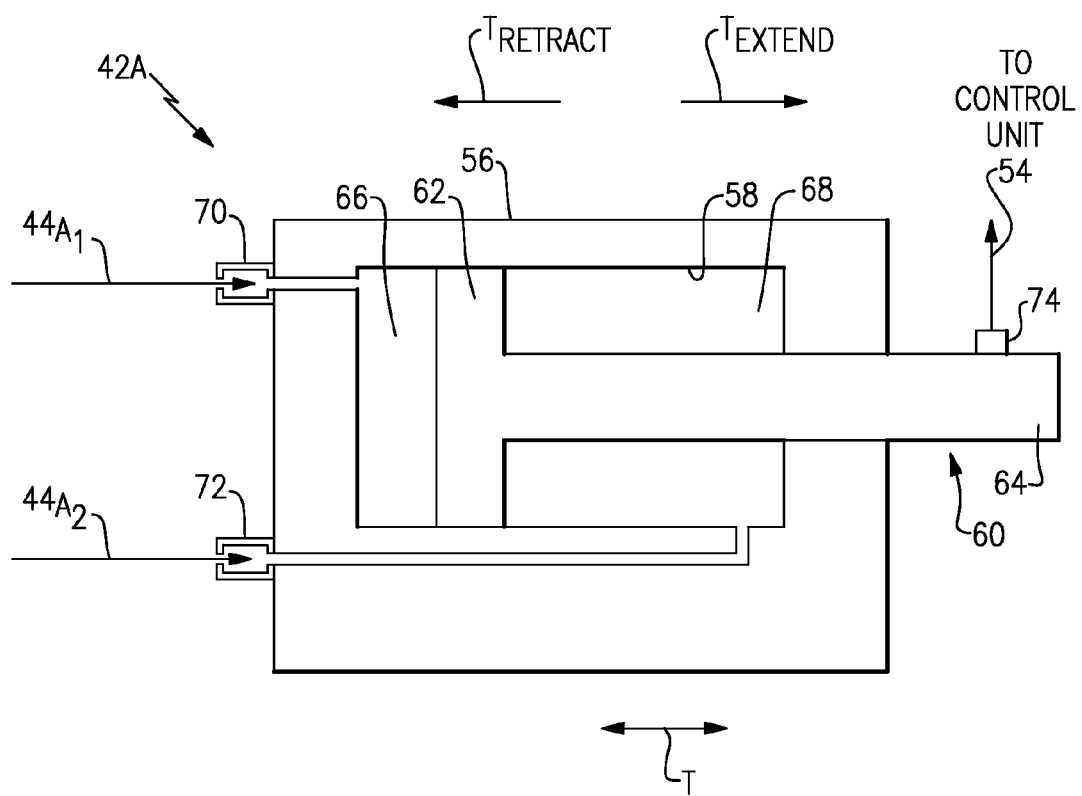
FIG. 4 schematically illustrates an example actuator.

FIG. 4 schematically illustrates an example actuator. In this example, the actuator 42A includes an exterior housing 56 and an interior chamber 58. A piston 60 is translatable in the direction T within the interior chamber 58. In this example, the piston 60 includes a cylindrically shaped head 62 and a shaft 64. In that same example, the interior chamber 58 would be cylindrically shaped. There may be one or more seals (not shown) between the piston head 62 and the interior chamber 58.

The piston head 62 divides the interior chamber 58 into a first side 66 and a second side 68. The first side 66 of the interior chamber 58 is fluidly coupled to a first port 70, which is fluidly coupled to a first inlet fluid line $44_{A1}$. Likewise, the second side 68 of the interior chamber 58 is fluidly coupled to a second outlet fluid line $44_{A2}$ via a second port 72. The first and second fluid lines $44_{A1}$-$44_{A2}$ are fluidly coupled to the valve assembly 46.

The piston head 62 is moveable in the direction T based on a pressure differential between the first and second sides 66, 68. Movement of the piston head 62 and, in turn, the shaft 64 is monitored by a position sensor 74. As illustrated, the position sensor 74 is electrically coupled to the control unit 54. The position sensor 74 need not be positioned on the shaft 64. In other examples, a position sensor can be placed on the translatable structure 36. The control unit 54 uses the information from the position sensors 74 to detect an asymmetric load from the translatable structure 36.

In order to move the translatable structure in the direction $T_{EXTEND}$ (e.g., in the right-hand direction relative to FIG. 4), the control unit 54 provides an instruction to the valve assembly 46 to provide relatively high pressure fluid from the source 48 to the line $44_{A1}$, and into the first port 70. Although not pictured, the control unit 54 would also instruct the valve assembly 46 to provide relatively high pressure fluid to the additional actuators in the exhaust module 22 in a similar way.

As the relatively high pressure fluid enters the first side 66 of the interior chamber 58, the piston head 62 moves in the direction $T_{EXTEND}$. Fluid on the second side 68 of the chamber 58 is then expelled from the second port 72, to the line $44_{A2}$, and is then returned to the fluid source 48 via the valve assembly 46 and the low pressure return 52. To move the piston head 62 in the opposite direction, $T_{RETRACT}$, the control unit 54 instructs the valve assembly 46 to direct the relatively high pressure fluid into the second port 72. In that case, the fluid in the first side 66 of the interior chamber is directed back to the fluid source 48 via the first port 70.

The actuator $42_A$ illustrated in FIG. 4 is representative of the actuators of this disclosure. However, in this disclosure, at least one of the actuators coupled to the translatable structure 36 includes an adjustable flow regulator.

Figure 5:
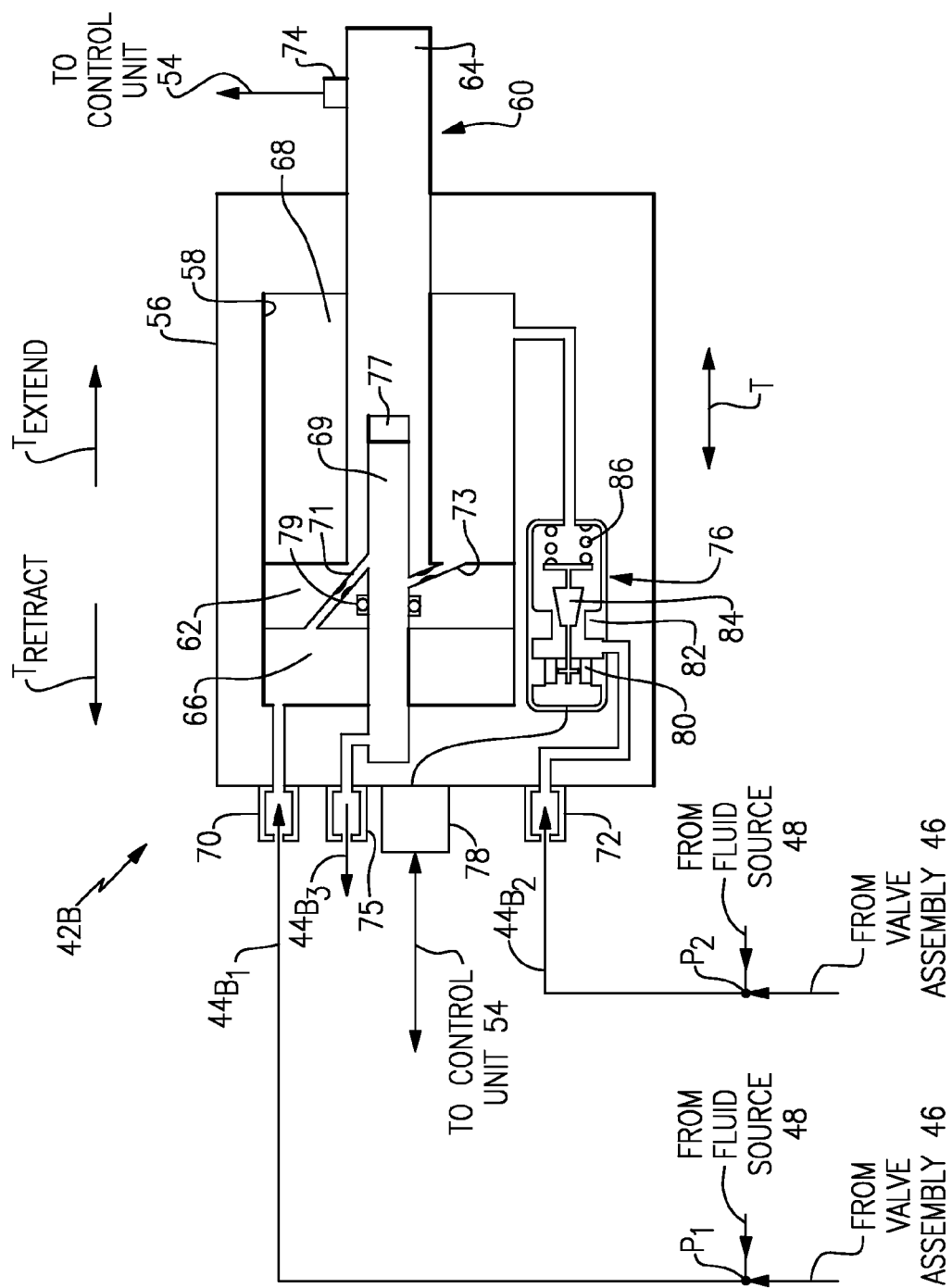
FIG. 5 schematically illustrates an example actuator including an adjustable flow regulator.

With reference to FIG. 5, the actuator $42_B$ includes an adjustable flow regulator 76 between the second port 72 and the second side 68 of the interior chamber 58. The adjustable flow regulator 76 could be provided between the first port 70 and the first side 66 in other examples. In this example, the first and second ports 70, 72 are in communication with inlet lines $44B_1$, $44B_2$ coupled to the fluid source 48 directly and via the valve assembly 46 as illustrated schematically at points $P_1$, $P_2$. In this example, the inlet lines $44B_1$, $44B_2$ receive a constant flow of fluid from the fluid source 48. The flow may be regulated by orifices arranged between the fluid source 48 and the points $P_1$, $P_2$. Thus, essentially, the actuator 42B always has a baseline level of flow therethrough. When movement of the piston head 62 is desired, the inlet lines $44B_1$, $44B_2$ also receive flow from the valve assembly 46. The additional flow from the valve assembly 46 essentially provides a "boost" in flow above the baseline level into the first port 70 to cause the piston to extend, or the second port 72 to cause the piston to retract.

Further, in the FIG. 5 example, the piston head 62 and shaft 64 circumscribe a plenum 69. The plenum 69 is fluidly coupled to the first side 66 via a first passageway 71 extending through the piston head 62. The plenum 69 is also fluidly coupled to the second side 68 via a second passageway 73 extending through the piston head 62. The passageways 71, 73 may include appropriately sized orifices to regulate flow therein. Finally, the plenum 69 is fluidly coupled to a third port 75, which in turn is fluidly coupled to a fluid return line $44B_3$. The fluid return line $44B_3$ directs fluid back to the valve assembly 46, and ultimately the low pressure return 52.

In this example, the plenum 69 is fixed relative to the exterior housing 56. The piston head 62 and shaft include a cavity 77 corresponding to the plenum, and are sealed, by a sealing member 79, to prevent fluid leakage between the first side 66 and the plenum 69. In one example, the plenum 69 is provided by a hollow cylindrical structure with openings in the exterior wall thereof to fluidly couple the passageways 71, 73, with the third port 75.

The adjustable flow regulator 76 in this example is an adjustable electromechanical valve and is electrically coupled to the control unit 54 via an electrical connector 78. The control unit 54 is operable to provide instructions to the adjustable flow regulator 76 to adjust valve position.

In this example, the adjustable flow regulator includes a motor 80, a valve seat 82, a valve pin 84, and a biasing element 86. The motor 80 is operable to selectively move the valve pin 84 relative to the valve seat 82 against the bias of the biasing spring number 86. In this example, the valve pin 84 is incrementally adjustable to an infinite number of positions. As the motor 80 adjusts the position of the valve (e.g., relative position of the valve pin 84 and the valve seat 82), the pressure loss between the second side 68 of the interior chamber 58 and the second port 72 varies.

During operation of the gas turbine engine 20, certain conditions may occur where the translatable structure 36 moves from its desired position. In particular, during a tactical maneuver, for example, g-forces exerted on the translatable structure 36 may cause it to tilt. Additionally or alternatively, while moving the translatable structure 36 in the direction T, friction on a certain portion of the translatable structure 36 may also cause the translatable structure to tilt. Such tilting could create asymmetric movement of the translatable structure 36, which is not desired.

With continued reference to FIG. 5, one example asymmetric movement will be described with reference to the actuator arrangement of FIG. 3. In this example, when moving the translatable structure 36 in an extend direction (in the direction $T_{EXTEND}$), there may be increased friction and resistance to movement adjacent the location of the actuator $42_B$ (e.g., approximately the 10 o'clock position of the translatable structure 36, relative to FIG. 3). In that instance, the control unit 54 would provide instructions to the adjustable flow regulator 76 to incrementally close the adjustable flow regulator 76 to restrict fluid flow into the second side 68 of the interior chamber 58, thus reducing the pressure developed on the second side 68 of the piston 62, thereby increasing the net force produced by the piston in the direction $T_{EXTEND}$. The control unit 54 would then continually monitor the position of the translatable structure 36 until the asymmetric movement was corrected.

Figure 6:
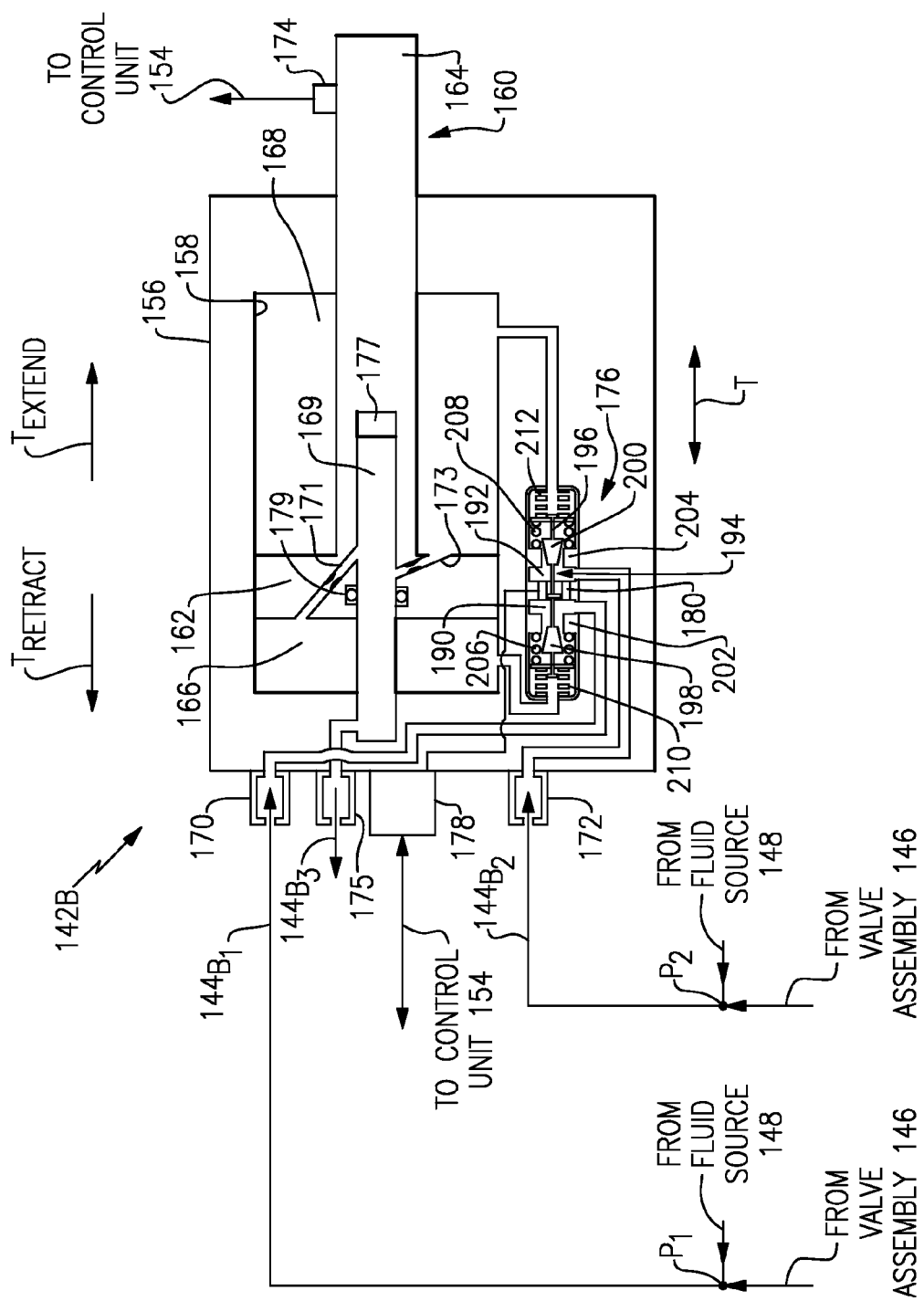
FIG. 6 schematically illustrates another example actuator including another type of adjustable flow regulator.

FIG. 6 shows another example actuator according to this disclosure. In FIG. 6, the actuator 142B is configured to selectively supplement movement of an actuator in both the $T_{RETRACT}$ and $T_{EXTEND}$ directions. To the extent not otherwise described or shown, the actuator 142B corresponds to the actuator 42B of FIG. 5, with like parts having reference numerals preappended with a "1."

In FIG. 6, the actuator 142B includes an adjustable flow regulator 176 configured to selectively adjust flow to each of the first side 166 and the second side 168. In this example, the adjustable flow regulator 176 includes a first inlet chamber 190 and a second inlet chamber 192. The first and second inlet chambers 190, 192 are fluidly separated from one another. The first inlet chamber 190 is fluidly coupled to the first port 170 and the second inlet chamber 192 is fluidly coupled to the second port 172. The amount of fluid allowed to flow from the first and second ports 170, 172 into the respective first and second sides 166, 168 is dictated by movement of the adjustable flow regulator 176.

In this example, the adjustable flow regulator 176 includes an armature 194, which includes a shaft 196 that is translatable in response to a motor 180. Like the motor 80, the motor 180 receives instructions from the control unit 154 via an electrical connector 178. The armature 194 includes valve pins 198, 200, each of which are mounted to the shaft 196. The valve pins 198, 200 are configured to translate relative to a corresponding valve seat 202, 204. In this example, the motor 180 must overcome the bias of springs 206, 208, which urge the shaft 196 in a direction away from the motor, to move the shaft 196. The springs 206, 208 rest against plates 210, 212, which include openings to allow fluid to flow therethrough.

The adjustable flow regulator 176 is operable to decrease pressure of the fluid within either one of the first side 166 or the second side 168. For purpose of illustrating one example, in order to assist movement of the piston 162 in the $T_{RETRACT}$ direction, the motor 180 would be instructed to move the shaft 196 toward the second inlet chamber 192. As the shaft 196 moves toward the second inlet chamber 192 (e.g., toward the right-hand direction relative to FIG. 6), the valve pin 198 moves closer to the valve seat 202, which results in an incrementally large pressure drop between the first port 170 and the first side 166 (and vice versa as the shaft 196 moves toward the first inlet chamber 190). This reduces the relative pressure in the first side 166, and increases the force of the piston 162 in the $T_{RETRACT}$ direction. Movement of the shaft 196 in the opposite direction will increase the force in the $T_{EXTEND}$ direction. Again, the adjustable flow regulator 176 is operable to assist movement of the actuator 142B in either the $T_{RETRACT}$ or $T_{EXTEND}$ directions.

While in the FIG. 3 example the actuator $42_B$ is the only actuator that includes an adjustable flow regulator 76, other actuators (e.g., $42_A$ and/or $42_C$-$42_E$) can also include adjustable flow regulators. To reduce costs, however, some arrangements may only include one actuator having an adjustable flow regulator. In that case, the actuator having an adjustable flow regulator can be selectively positioned in a location that is likely to experience resistance to movement during operation of the gas turbine engine 20.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A variable area nozzle for a gas turbine engine, comprising:
    a control unit;
    a translatable structure; and
    a plurality of actuators configured to adjust the position of the translatable structure, the plurality of actuators fluidly coupled to a common fluid source, wherein the control unit is configured to provide instructions to at least one of the actuators to compensate for an asymmetric load from the translatable structure, wherein the plurality of actuators each include a piston moveable within a chamber;
    a valve assembly operable to direct relatively high pressure fluid to one of a first side of the chamber and a second side of the chamber to adjust the position of the piston, wherein at least one of the plurality of actuators includes an adjustable flow regulator operable to adjust the relative amount of fluid directed to the at least one actuator when the asymmetric load from the translatable structure is detected; and
    at least one sensor configured to generate a signal indicative of the movement of the translatable structure, wherein the at least one sensor includes a position sensor;
    wherein the control unit is configured to provide instructions to the adjustable flow regulator to adjust the pressure differential between the first and second sides of the chamber when the signal from the at least one position sensor indicates that there has been an asymmetric movement of the translatable structure.

* * * * *